United States Patent [19]

Geisthardt

[11] Patent Number: 4,679,367

[45] Date of Patent: Jul. 14, 1987

[54] INTERCONNECTING OF WOODEN MEMBERS

[75] Inventor: Alan C. Geisthardt, North Fond du Lac, Wis.

[73] Assignee: Jack Walters & Sons, Corp., Allenton, Wis.

[21] Appl. No.: 770,691

[22] Filed: Aug. 29, 1985

[51] Int. Cl.⁴ .......................... B24B 47/02; B27F 7/00
[52] U.S. Cl. .................................. 52/233; 52/DIG. 6; 52/363; 52/730; 144/353; 411/458; 411/467
[58] Field of Search .................. 52/DIG. 6, 729, 730, 52/361, 362, 363, 233; 144/353; 411/458, 466, 467, 468

[56] References Cited

U.S. PATENT DOCUMENTS

| | | | |
|---|---|---|---|
| 797,083 | 8/1905 | Stowe | 52/DIG. 6 |
| 1,297,584 | 3/1919 | Mock | 411/458 |
| 1,806,522 | 5/1931 | Gruyter | 411/458 |
| 2,264,666 | 12/1941 | Hexdall | 248/217.3 |
| 2,396,030 | 3/1946 | Terry | 411/458 |
| 2,974,378 | 3/1961 | Lidsky | 52/DIG. 6 |
| 3,090,088 | 5/1963 | Foley et al. | 411/467 |
| 3,172,171 | 3/1965 | Knight | 411/458 |
| 3,601,428 | 8/1971 | Gilb | 52/702 |
| 3,686,809 | 8/1972 | Lindal | 144/353 |
| 4,429,500 | 2/1984 | Farmont | 411/458 |
| 4,479,342 | 10/1984 | Eberle | 52/742 |
| 4,488,389 | 12/1984 | Farmont | 411/466 |

Primary Examiner—W. D. Bray
Attorney, Agent, or Firm—Andrus, Sceales, Starke & Sawall

[57] ABSTRACT

A rigid wooden composite assembly such as a beam, post or the like, includes a plurality of elongated wooden boards of varying lengths disposed in face-to-face relationship and forming a plurality of layers. At least one of the layers includes a plurality of boards, the inner ends of which abut to form a joint therebetween. A connector device has a base plate with openings therein. Prongs extend outwardly from the plate and initially generally normal thereto. The prongs of adjacent openings extend in opposite directions from the plate. The connector device is disposed between the layers so that the base plate bridges the inner portion of the joint and the oppositely extending prongs penetrate the opposing board faces. When the assembly is compressed together, the prongs deform and clinchingly engage the wood surrounding the joint. The abutting boards are spliced together, and the facing boards are held tightly together.

17 Claims, 8 Drawing Figures

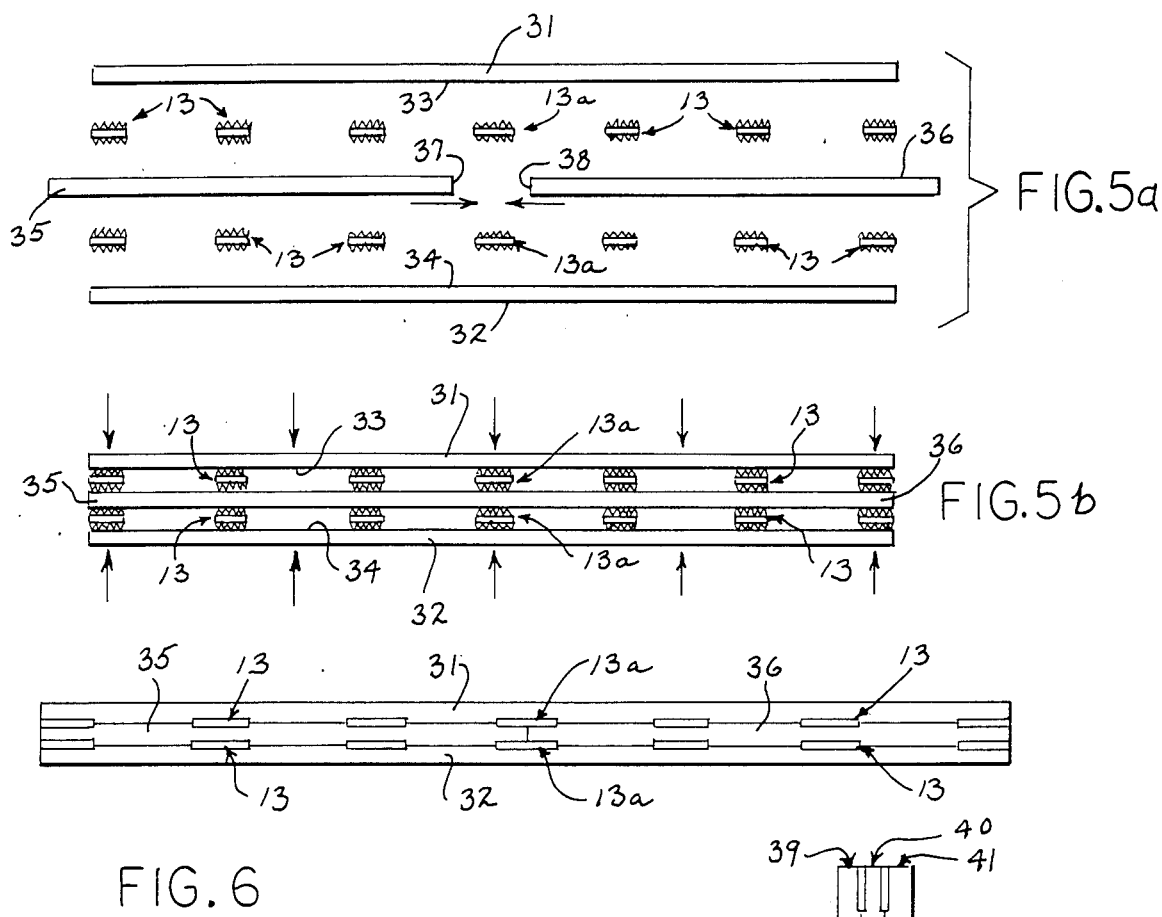
FIG.5a
FIG.5b
FIG.6
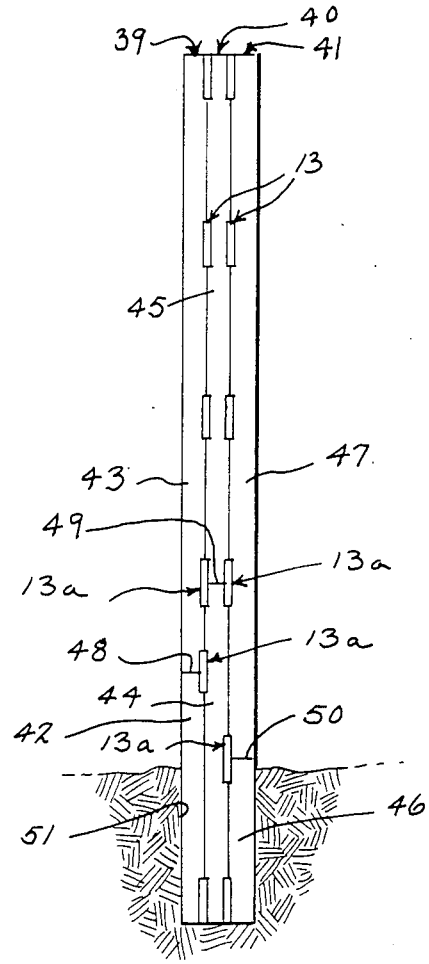
FIG.7

INTERCONNECTING OF WOODEN MEMBERS

U.S. Prior Art Of Interest

| U.S. Pat. No. | Inventor | Issue Date |
|---|---|---|
| 797,083 | Stowe | 1905 |
| 1,297,584 | Mock | 1919 |
| 1,806,522 | Gruyter | 1931 |
| 2,264,666 | Hexdall | 1941 |
| 2,396,030 | Terry | 1946 |
| 3,090,088 | Foley et al | 1963 |
| 3,601,428 | Gilb | 1971 |
| 4,429,500 | Farmont | 1984 |
| 4,479,342 | Eberle | 1984 |

BACKGROUND AND SUMMARY OF THE INVENTION

This invention relates to interconnecting of wooden members, and more particularly to the interjoining of wooden timbers or boards to produce beams, columns, headers or other composite assemblies for use in the construction of buildings or the like. The invention is based on an improvement over certain of the concepts disclosed in the above-identified patents, and especially over the concepts disclosed in U.S. Pat. No. 3,090,088.

In that patent, a connector device is disclosed which generally comprises a flat metal truss plate having a plurality of openings therein, with a plurality of prongs formed at the opening edges and extending unidirectionally outwardly of one plate face. According to the description in the patent, the prongs are formed so that, upon placing the connector device across the exposed outside joint portion of abutting wood members with the prongs facing the wood, and then applying compressive forces, the prongs enter the wood and bend or flare outwardly to clinch the wood between prongs of adjacent openings. When such connector devices are mounted to the opposite faces of the exposed joint between a pair of abutting board ends, a strong structure is created.

In the construction of buildings or the like, it is often desirable to utilize a beam or column which comprises a plurality of boards which are arranged in abutting face-to-face relationship, rather than in an end-to-end relation such as is contemplated in U.S. Pat. No. 3,090,088. The resultant composite or laminated beam or column of boards serves as a substitute for an integral post made from a single piece of wood, which can be quite expensive. See, for example, U.S. Pat. No. 4,479,342. Heretofore, the composite laminated structure has often been created by nailing or bolting the boards together in facing relationship, a procedure which has not always been found to be fully adequate or permanent.

It has also been suggested to join the faces of adjacent boards, as by connector devices which utilize straight nails or triangular barbs extending outwardly from both faces of a base plate. See, for example, U.S. Pat. Nos. 797,083, 1,806,522 and 4,429,500. The known devices of these patents are subject to numerous disadvantages, such as being only temporary or requiring supplemental bolting or being basically unworkable without external supports, respectively. Their contemplated connecting constructions are not nearly as efficient as that of the aforesaid U.S. Pat. No. 3,090,088 which utilizes the one-sided clinching prong structure.

It is a task of the present invention to make it possible to construct a multi-layered or laminated wooden beam or column which utilizes the superior concepts of the U.S. Pat. No. 3,090,088 throughout. It is a further task to construct such a beam or column structure without the need for supplemental connectors such as nails, bolts, truss plates and the like. It is another task to make it possible to manufacture a multi-layered beam or column which includes at least some short, and thus inexpensive, pieces, and wherein only a portion of the member need be treated with a wood preservative. It is yet another task to modify the connector structure disclosed in U.S. Pat. No. 3,090,088 in such a manner that the previously mentioned tasks may be more easily accomplished, and wherein the composite wood structure is permanently joined synergistically and can carry a load independently of any additional support or connector device for the structure itself.

In accordance with the various aspects of the invention, the specially formed prongs of U.S. Pat. No. 3,090,088 are struck outwardly from adjacent openings in the plate in directions which are opposite from each other. Thus, each face of the base plate includes alternate openings in blank, and openings from which extend a set of prongs generally normal to the plate. The advantage of being able to clinch the wood when compressive forces are applied is thereby made available to both sides of the connector base plate so that the connector device is usable to laminate multiple layers of boards in face-to-face relationship, which was not possible or contemplated in the original structure of U.S. Pat. No. 3,090,088.

In manufacturing beams or columns using the improved connector device, and in one embodiment, at least one long jointless board is provided, with a plurality of short boards generally equaling in total length the longitudinal extent of the long board being positioned in facing relationship with the latter. The connector device of the invention is positioned between the faces of the long and short boards, with the prongs extending across the abutting joint between each pair of short boards. Compression is then applied to the assembly, which forces the oppositely extending prongs into the opposed board faces until the assembly forms a tight unitary structure with the prongs clinching the wood in the boards on both sides of the connector. The connector itself is generally buried within the composite structure and is not exposed to undesirable accidental external forces, such as being hit and weakened by a swaying metal beam or the like during construction. In the areas remote from each abutting joint, further connector devices may also be placed to stabilize the beam or column against lateral sliding or swinging of the wood members in the plane of the interface therebetween.

In another embodiment, each layer in a composite multi-layer construction comprises a plurality of short boards of different lengths, with the joints between abutting board ends being offset longitudinally from each other. The length of each layer is normally the same as the length of every other layer.

When more than two layers are included in the final assembly, a layer may include a single board, or multiple abutting boards.

In the various embodiments contemplated, no external truss plate need be used at any exposed outer joint portion disposed between abutting boards.

BRIEF DESCRIPTION OF THE DRAWINGS

The accompanying drawings illustrate the best mode presently contemplated by the inventor for carrying out the invention.

In the drawings:

FIGS. 5a and 5b schematically illustrate the method of forming a composite beam or post utilizing certain aspects of the invention;

FIG. 6 is a generally schematic side elevation of one embodiment of laminated assembly formed in accordance with the method of FIGS. 5a and 5b; and FIG. 7 is a view generally similar to FIG. 6 and showing another embodiment of assembly.

DESCRIPTION OF THE PREFERRED EMBODIMENTS

Figure 1:
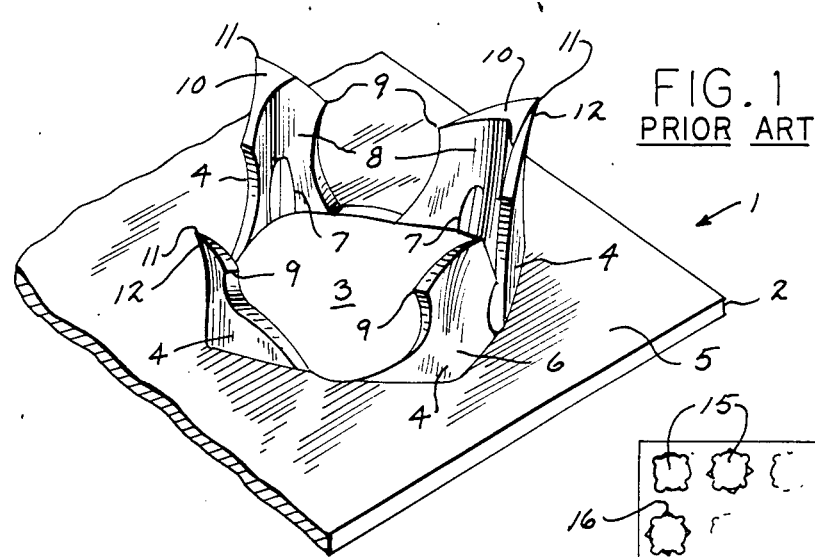
FIG. 1 is an enlarged fragmentary view of a connector device constructed in accordance with the known device of U.S. Pat. No. 3,090,088 and showing the prongs extending outwardly unidirectionally from the opening in the base plate.

FIG. 1 fragmentarily illustrates a portion of a connector device 1 of U.S. Pat. No, 3,090,088, which includes a base plate 2 having a plurality of openings 3 therein, only one opening being shown in this view. Two pair of prongs 4 are struck from plate 2 and extend from the edges of opening 3 and outwardly laterally from one face 5 of the plate. The prongs 4 for all openings 3 extend unidirectionally from plate face 5, leaving the opposite plate face generally smooth and planular.

All of prongs 4 are substantially identical. As shown, each prong 4 includes a main body portion 6 which extends from plate 2 and which is formed near its base at a generally right angle, providing a definite internal right angular corner impression in an area designated at 7. Area 7 is shown as terminating about midway of the length of the prong, and merges outwardly into a curvilinear portion 8 which includes a pair of barbs 9 which are disposed on a line generally parallel to base plate 2. A tip portion 10 is disposed outwardly beyond barbs 9 and has a pointed end 11. The tip portion 10 is flared backwardly or outwardly, as at 12.

The construction and placement of prongs 4 is such that, upon pressing connector device 1 into wood, prongs of adjacent openings clinch the wood together, as shown in U.S. Pat. No. 3,090,088, the entire disclosure of which is incorporated herein by reference.

As previously discussed, it is one of the tasks or objects of the present invention to modify the connector device of U.S. Pat. No. 3,090,088 so that a composite wooden beam or column may be formed with a plurality of boards in abutting face-to-face relationship, and with the resultant assembly having numerous advantages. These advantages include, among other things, the lack of need of nails or other supplemental connectors and the ability to use boards of different lengths.

Figure 2:
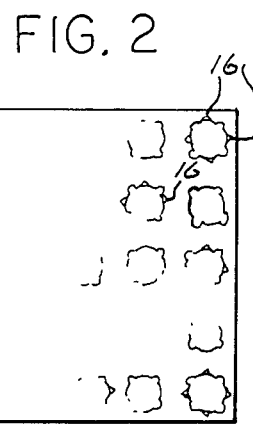
FIG. 2 is a plan view of a connector device constructed in accordance with the various aspects of the present invention.
Figure 3:
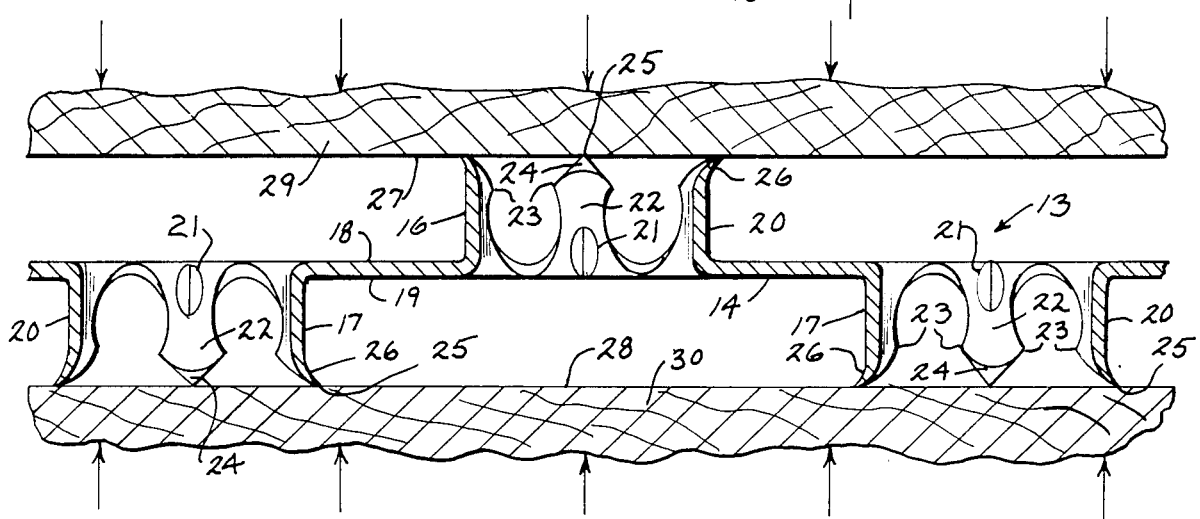
FIG. 3 is an enlarged sectional view taken generally on line 3—3 of FIG. 2 and showing the connector device positioned between opposing faces of a pair of boards with compressive forces about to be applied.

Referring to FIGS. 2 and 3, an aspect of the present invention includes the utilization of a connector device 13 having a base plate 14 and a plurality of spaced openings 15 aligned in suitable rows extending the length of the plate. In the present embodiment, alternate adjacent openings 15 have struck from them a plurality of pairs of prongs 16, 17, with prongs 16 extending laterally in the opposite direction as prongs 17, as from the respective plate faces 18, 19. Prongs 16 and 17 are generally similar to prongs 4 of FIG. 1, and include a main body 20, an inside corner 21, a curvilinear portion 22, barbs 23, and a tip portion 24 with a pointed end 25 and outward flare 26.

Figure 4:
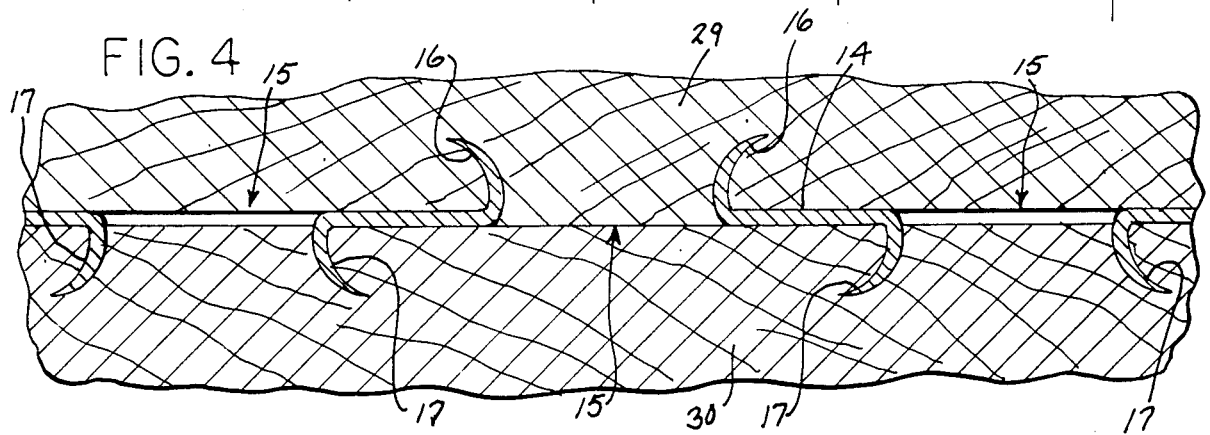
FIG. 4 is a sectional view illustrating the multi-layer assembly after application of compression in FIG. 3.

Generally, and as illustrated in FIGS. 3 and 4, connector device 13 may be positioned between the opposed faces 27, 28 of a pair of parallel boards 29, 30. Upon the application of compressive forces by opposed rollers (not shown) or any other suitable means, as illustrated by the arrows in FIG. 3, the initially normally extending prongs are forced into the wood of both boards simultaneously and are deformed and curved outwardly to provide a wood clinching action on both sides of connector device 13, as shown in the illustration of a completed rigid composite assembly in FIG. 4.

FIGS. 5a and 5b illustrate the method of creating an elongated multi-layer composite beam or post assembly made from a plurality of boards, and using the concepts of the invention. In the method, at least one long jointless board is provided. FIG. 5a shows two such long boards 31, 32 of equal length which are disposed in parallelism and with their respective inner faces 33, 34 in facing relationship and spaced apart. A plurality of shorter boards (in this instance two) 35, 36 are spacingly positioned between and in parallelism with boards 31 and 32, with the total length of the shorter boards being generally the same as the length of the longer boards. The flat planular parallel inner ends 37, 38 of shorter boards 35 and 36 are brought into abutting end-to-end relationship. A plurality of connector devices 13 are positioned in parallelism between the centrally disposed short boards 35, 36 and one outer long board 31; as well as between short boards 35, 36 and the other outer long board 32. It should be noted that a connector device 13a bridges each side of the abutting edge joint between short boards 35 and 36. All of the various members are brought into contact and, as shown in FIG. 5b, a suitable compressive force (illustrated by the arrows) is applied.

The resultant unified structure, with short boards 35 and 36 tightly sandwiched between long board faces 31 and 32, is shown in FIG. 6. The prongs which extend from both faces of connector devices 13 and 13a engage and penetrate the wood of all the boards in a tight clinching ation, to hold the facing boards in adjacent layers together. As to devices 13a, the prongs thereof surround the joint and splice the boards forming the joint together.

FIG. 7 illustrates a slightly different embodiment, wherein a laminated post or column is formed of a plurality of layers 39, 40 and 41; and wherein each layer comprises a plurality of boards 42-43, 44-45, 46-47 which are disposed in abutting end-to-end relationship, as at respective joints 48, 49 and 50. The total length of the boards in each layer is generally equal to provide a post of uniform length. As in the construction of FIG. 6, connector devices 13a bridge each of the joints. However, a connector device 13a is disposed on both sides of only central joint 49, with joints 48 and 50 having a connector device 13 disposed only on the inner side thereof. Although a connector device such as shown at 1 in FIG. 1 could be placed across the exposed outer portions of outer joints 48 and 50, forming a truss, it is believed that such devices are generally unnecessary when combined with the connector of the present invention.

In the construction of both FIG. 6 and FIG. 7, the faces of base plates 14 and the prongs 16 and 17 of connector devices 13 and 13a are buried within the final composite assembly, with only the longitudinal edges of the respective base plates 14 exposed.

The assembly of FIG. 7 is ideal for use as a post or column which is set into a hole 51 which has been bored into the ground. Many wooden posts have heretofore been treated with a wood preservative, such as "Creosote". However, it has been discovered that wood so treated may be harmful to animals and humans who come in contact with it. By using short boards 42, 44, 46 at one end, and long boards 43, 45, 47 at the other end, the problem of exposure to preservativetreated wood may be substantially reduced. The long boards, which are adapted to be disposed above ground and thus exposed to animals and humans, can be left untreated. At least the shortest board 46, which is adapted to be buried below ground, can be suitably pressure treated with a wood preservative prior to being assembled into the composite post. The other short boards 42 and 44 may also be treated, but will have short treated portions extending above hole 51.

The various aspects of the invention are directed to a number of unique concepts in the art of interconnecting of wooden members. Not only is the connector device of U.S. Pat. No. 3,090,088 substantially improved in structure and function, but the method of assembling a wooden multi-layer beam or post using the device is quick and relatively easy, and the resultant composite assembly has been found to be of great strength which in many instances, and although at least some boards are spliced together end-to-end, tends to equal the strength of a structure having no splices in view of the efficient transferring of loads between boards. No supplemental nails or bolts are necessary.

Various modes of carrying out the invention are contemplated as being within the scope of the following claims particularly pointing out and distinctly claiming the subject matter which is regarded as to the invention.

I claim:

1. A method of making a wooden composite assembly such as a beam, post or the like, said method comprising:
   (a) positioning a plurality of elongated wooden boards of varying lengths in spaced face-to-face relationship to thereby form a plurality of parallel layers and so that at least one of said layers is formed of a plurality of boards having a total length about equal to the length of an adjacent layer,
   (b) abutting the inner ends of the plurality of boards in said at least one of said layers to form a generally planular joint between said abutting ends,
   (c) providing a connector device having a base plate with a plurality of spaced openings therein, and with said openings having a plurality of wood engaging prongs extending outwardly therefrom and initially generally normal to said base plate, the prongs of alternate adjacent openings extending in opposite directions from said base plate,
   (d) positioning said connector device between said parallel layers so that said base plate bridges the inner portion of said joint and so that oppositely extending prongs engage the opposing faces of boards in adjacent layers and form an assemblage,
   (e) and compressing said assemblage to form a rigid composite assembly so that said prongs deform and clinchingly engage the wood surrounding said joint and splice the boards forming said joint together as well as holding facing boards in adjacent layers together.

2. The method of claim 1 wherein a layer disposed adjacent said abutting boards (35, 36) comprises a single board (31 or 32) having a length about equal to the total length of said abutting boards.

3. The method of claim 2 and further comprising:
   (a) positioning the plurality of abutting boards (35, 36) between a pair of jointless boards (31, 32),
   (b) and positioning a pair of said connector devices (13a) so that they bridge each side of said joint prior to the compressing step,
   (c) said compressing step sandwiching said plurality of abutting boards (35, 36) and said pair of connector devices (13a) between said pair of jointless boards (31, 32).

4. The method of claim 1:
   (a) wherein each said parallel layer is formed of a plurality of boards,
   (b) and said abutting step abuts the ends of the boards in each layer to form a said joint in each layer,
   (c) and a connector device is positioned to bridge the inner portion of the joint in each layer.

5. The method of claim 4:
   (a) wherein at least some of said joints (48, 50) are disposed in an outside layer (39, 41) so that the outer portions of said last-named joints are exposed,
   (b) and wherein at least one of said joints (49) is disposed in an inside layer (40) and providing a pair of inner joint portions,
   (c) and further comprising positioning a said connector device (13a) adjacent both sides of said inner joint portions.

6. The method of claim 5 wherein, upon positioning a said connector device (13a), the said outer joint portions are left exposed.

7. The method of claim 1 wherein each said oppositely extending prong (16, 17) of said connector device (13, 13a) includes:
   (a) a main body portion (20) extending from adjacent a said opening (15) of said base plate (14),
   (b) a generally right angular corner (21) formed internally of said main body portion,
   (c) a curvilinear portion (22) merging outwardly from said internal corner (21),
   (d) a pair of barbs (23) disposed adjacent said curvilinear portion,
   (e). and a tip portion (24) disposed outwardly of said barbs and including a pointed end (25),
   (f) said tip portion being outwardly flared (26).

8. The method of claim 3 wherein each said oppositely extending prong (16, 17) of said connector device (13, 13a) includes:
   (a) a main body portion (20) extending from adjacent a said opening (15) of said base plate (14),
   (b) a generally right angular corner (21) formed internally of said main body portion,
   (c) a curvilinear portion (22) merging outwardly from said internal corner (21), (d) a pair of barbs (23) disposed adjacent said curvilinear portion, (e) and a tip portion (24) disposed outwardly of said barbs and including a pointed end (25), (f) said tip portion being outwardly flared (26).

9. The method of claim 6 wherein each said oppositely extending prong (16, 17) of said connector device (13, 13a) includes:

(a) a main body portion (20) extending from adjacent a said opening (15) of said base plate (14), (b) a generally right angular corner (21) formed internally of said main body portion, (c) a curvilinear portion (22) merging outwardly from said internal corner (21), (d) a pair of barbs (23) disposed adjacent said curvilinear portion, (e) and a tip portion (24) disposed outwardly of said barbs and including a pointed end (25), (f) said tip portion being outwardly flared (26).

10. A wooden composite assembly made in accordance with the method of claim 1, 3, 6, 7 or 8.

11. A rigid wooden composite assembly such as a beam, post or the like, said assembly comprising, in combination:

(a) a plurality of elongated wooden boards of varying lengths disposed in face-to-face relationship and forming a plurality of parallel layers with at least one of said layers being formed of a plurality of boards having a total length about equal to the length of an adjacent layer, (b) the inner ends of said last-named plurality of boards being disposed in abutting relationship and thereby forming a generally planular joint therebetween, (c) and a connector device having a base plate with a plurality of spaced openings therein, and with said openings having a plurality of prongs extending outwardly therefrom and initially in a direction generally normal to said base plate, (d) the prongs of alternate adjacent openings extending in opposite directions from said base plate, (e) said connector device being disposed between said parallel layers so that said base plate bridges the inner portion of said joint with said oppositely extending prongs penetrating the opposing faces of boards in adjacent layers, (f) said assembly being compressed together into a unified structure with said prongs being deformed and clinchingly engaging the wood surrounding said joint and splicing the boards forming said joint together as well as holding facing boards in adjacent layers together.

12. The composite assembly of claim 11 wherein a layer disposed adjacent said abutting boards (35, 36) comprises a single board (31 or 32) having a length about equal to the total length of said abutting boards.

13. The composite assembly of claim 12 wherein:

(a) said plurality of abutting boards (35, 36) is disposed between a pair of jointless boards (31, 32), (b) and a pair of said connector devices (13a) are disposed to bridge each side of said joint.

14. The composite assembly of claim 11:

(a) wherein each said parallel layer is formed of a plurality of abutting boards to thereby form a said joint in each layer, (b) and a connector device is disposed to bridge the inner portion of the joint in each layer.

15. The composite assembly of claim 14:

(a) wherein at least some of said joints (48, 50) are disposed in an outside layer (39, 41) and form outer joint portions, (b) and wherein at least one of said joints (49) is disposed in an inside layer (40) to provide a pair of inner joint portions, (c) a said connector device (13a) being disposed adjacent both sides of said inner joint portions.

16. The composite assembly of claim 15 wherein said outer joint portions of the joints (48,50) disposed in an outside layer (39, 41) are exposed.

17. The composite assembly of claim 11, 13 or 16 wherein each said oppositely extending prong (16, 17) of said connector device (13, 13a) comprises:

(a) a main body portion (20) extending from adjacent a said opening (15) of said base plate (14), (b) a generally right angular corner (21) formed internally of said main body portion, (c) a curvilinear portion (22) merging outwardly from said internal corner (21), (d) a pair of barbs (23) disposed adjacent said curvilinear portion, (e) and a tip portion (24) disposed outwardly of said barbs and including a pointed end (25), (f) said tip portion being outwardly flared (26).

* * * * *